United States Patent [19]
Sheehan et al.

[11] Patent Number: 4,679,446
[45] Date of Patent: Jul. 14, 1987

[54] MULTI-VOLUME DISPLACEMENT PIPETTE

[75] Inventors: Neil J. Sheehan, Berkeley; Jon E. Oppenlander, Lafayette; Richard P. Fleenor, Monte Sereno, all of Calif.

[73] Assignee: Baxter Travenol Laboratories, Inc., Deerfield, Ill.

[21] Appl. No.: 773,954

[22] Filed: Sep. 9, 1985

[51] Int. Cl.[4] .......... G01N 1/14
[52] U.S. Cl. .......... 73/864.13; 73/864.14; 73/864.18; 422/100; 604/191; 604/218
[58] Field of Search .......... 73/864.01, 864.13, 864.14, 73/864.16, 864.17, 864.18; 422/100; 604/191, 208, 210, 218

[56] References Cited

U.S. PATENT DOCUMENTS

| | | | |
|---|---|---|---|
| 3,606,086 | 9/1971 | Drummond et al. | 604/210 X |
| 3,640,434 | 2/1972 | Walker | 73/864.18 X |
| 3,815,790 | 6/1974 | Allen et al. | 604/208 X |
| 3,827,305 | 8/1974 | Gilson et al. | 73/864.18 |
| 3,918,308 | 11/1975 | Reed | 73/864.14 |
| 4,054,062 | 10/1977 | Branham | 73/864.14 |
| 4,084,730 | 4/1978 | Franke et al. | 73/864.14 X |
| 4,178,803 | 12/1979 | Lee | 73/864.13 |
| 4,215,092 | 7/1980 | Suovaniemi et al. | 73/864.14 X |

FOREIGN PATENT DOCUMENTS

| | | | |
|---|---|---|---|
| 2651333 | 5/1978 | Fed. Rep. of Germany | 73/864.18 |
| 2029723 | 3/1980 | United Kingdom | 73/864.13 |
| 597411 | 3/1978 | U.S.S.R. | 73/864.16 |

*Primary Examiner*—Robert Spitzer
*Attorney, Agent, or Firm*—Susan B. Fentress; Paul C. Flattery

[57] ABSTRACT

A multi-volume displacement pipette assembly has a tubular body with a first end for receiving a plunger assembly and a second mounting end for mounting a removable dispensing tip to the tubular body. A first cylindrical chamber extends through the tubular body for holding a first volume of fluid. The first cylindrical chamber opens through the second end of the tubular body. At least one second cylindrical chamber extends through the tubular body for holding a second volume of fluid. The such at least one cylindrical chamber is coaxially aligned with the first chamber and is open through the second end of the tubular body through a fluid pathway extending through the tubular body to the second end. A plunger assembly is coaxially positioned within the tubular body and operatively mounted therein for reciprocal, longitudinal movement. The plunger assembly includes a first portion having an external diameter substantially equal to the internal diameter of the first cylindrical chamber and at least one second portion axially aligned with the first portion and having an external diameter substantially equal to the internal diameter of such at least one second cylindrical chamber. The pipette assembly includes removable dispensing tips which can be mounted on the second end of the tubular body. Depending upon which removable dispensing tip is mounted on the second end, the fluid pathway interconnecting such at least one second cylindrical chamber with the second end is either blocked or open to fluid flow.

6 Claims, 7 Drawing Figures

MULTI-VOLUME DISPLACEMENT PIPETTE

BACKGROUND OF THE INVENTION

The invention herein relates to a hand held pipette which can be used for transferring different volumes of liquid without the need for changing the volumetric capillary tube portion of the pipette assembly. More particularly, the multi-volume displacement pipette herein is a disposable capillary or tubular tip assembly and corresponding plunger assembly which can be mounted on reusable plunger actuation assemblies to transfer various volumes of liquid. The multi-volume displacement pipette also includes disposable pipette tips which can be removably mounted on the liquid dispensing end of the pipette assembly for controlling the volume of liquid to be transferred.

Laboratory techniques frequently require repetitious handling of very small samples of liquids, for example, in the range from 1 to 250 microliters. In many instances varying volumes of the same liquid is transferred. Various pipetting devices are commercially available to simplify these otherwise laborious pipetting procedures. Some of the pipetting devices are described in the prior patent art including U.S. Pats. Nos. 3,606,086; 3,815,790; 3,827,305; 3,918,308; 4,054,062; and 4,084,730.

Another commercially available pipetting device includes a disposable, integral capillary and plunger tip assembly wherein the plunger tip is collet attached to an adjustable plunger stroking mechanism carried in the pipette handle to which the capillary is separately attached. Such an assembly is described in co-pending patent application Ser. No. 588,921, titled "Hand-Held Pipette With Disposable Capillary," filed Mar. 12, 1984, now U.S. Pat. No. 4,567,780, and assigned to the same assignee as the present application and for which the entire disclosure thereof is incorporated herein by this reference. The pipette assembly described therein has a common body or handle which houses the volumetric stroking mechanism, control and display. The assembly includes a set of disposable capillary tip assemblies for a wide range of volume and a body extender providing an interface between the disposable tip assembly and body or handle. The pipette assembly is easily separated into its parts for autoclaving or for exchange of body extenders having different functions such as so-called repettor or air displacement or positive displacement functions.

It would be desirable to provide a pipette assembly which can accommodate the transfer of varying volumes of liquid without the need for replacing the capillary bore volumetric tube portion of the pipette assembly.

SUMMARY OF THE INVENTION

The multi-volume displacement pipette herein can be used to transfer various volumes of liquid by changing an easily removable, disposable tip assembly of the pipette. The tubular body portion of the pipette assembly containing the capillary bore for determining the volume of liquid to be transferred need not be changed. The tubular body contains a capillary bore which is a capillary bore comprised of a series of axially aligned capillary bores; i.e., chambers, of differing inside diameter and, therefore, volume. Associated with the capillary bore is a plunger assembly which is of differing outside diameter and which corresponds to the differing inside diameters of each of the capillary bores.

More particularly, the pipette assembly herein is directed to a multi-volume air displacement pipette which includes a tubular body having a first end for receiving a plunger and a second end including tip mounting means for receiving a removable or replaceable dispensing tip. The tubular body includes a first cylindrical chamber for holding a first volume of fluid (in most applications, air) which corresponds to a first volume of liquid to be transferred. The first cylindrical chamber opens through the second end of the tubualar body so that fluid can be transferred into or out of the first cylindrical chamber through such second end of the tubular body. The tubular body also includes at least one second cylidrical chamber for holding a second volume of fluid (again, air) which corresponds to a second volume of liquid which can be transferred by the assembly. The tubular body can include additional chambers to provide three, four, or more total chambers. The at least one second cylindrical chamber is coaxially aligned with the first cylindrical chamber. The second cylindrical chamber independently opens through the second end of the tubular body through a fluid pathway which extends through the tubular body and interconnects such second cylindrical chamber with the second end of the tubular body. The fluid pathway opens through the second end of the tubular body at a location spaced from the opening of the first cylindrical chamber through such second end of the tubular body. Any additional chambers similarly open through respective fluid pathways interconnected to the second end.

The multi-volume displacement pipette assembly herein also includes a plunger assembly which is coaxially aligned in the tubular body and operatively mounted therein for reciprocal, longitudinal movement. The plunger assembly includes a first portion which has an external diameter substantially equal to the internal diameter of the first cylindrical chamber. The plunger assembly includes at least one second portion axially aligned with the first portion and which has an external diameter substantially equal to the internal diameter of such at least one second cylindrical chamber in the tubular body. The plunger assembly includes equivalent portions for each of the chambers of the tubular body. The plunger assembly thus has a structure which coincides and cooperates with the chambers within the tubular body so that upon actuation of the plunger assembly and longitudinal movement of the plunger assembly within the chambers of the tubular body, fluid can be transferred in and out of the chambers. For an air placement pipette, such fluid is air and for a positive displacement pipette, the fluid is the liquid being transferred. The plunger assembly provides a fluid-tight seal along the longitudinal axis joining the cylindrical chambers so that there is no fluid flow directly between adjacent chambers. Such a fluid seal can be provided by O-rings which extend around the plunger assembly between chambers. By providing the fluid seals, the displaced fluid, be it air or liquid, follows its intended path from the respective chamber to the second end.

The multi-volume air displacement pipette herein also includes a removable dispensing tip which is adapted to be mounted on the second end of the tubular body. The removable dispensing tip, when mounted on the second end of the tubular body, selectively permits or prevents fluid flow through such fluid pathway extending through the tubular body and interconnecting such at least one second cylindrical chamber with the second end. By selecting the appropriate removable dispensing tip, fluid (i.e., air) can be transferred to and from the first cylindrical chamber and such at least one second cylindrical chamber or from the first cylindrical chamber alone. The removable dispensing tip selected can block the fluid pathway from such at least one second cylindrical chamber so as to prevent fluid from being transferred to and from such at least one second cylindrical chamber. The removable dispensing tip has a sufficiently large lumen for providing a reservoir for the liquid being transferred such that liquid need not enter the cylindrical chambers of the pipette assembly.

In a more particular aspect, the multi-volume displacement pipette herein is a multi-volume air displacement pipette capable of delivering three differing volumes of liquid. In such an embodiment, the tubular body has a first end for receiving the plunger assembly and a second end having a tip mounting shape for receiving a removable dispensing tip. The tubular body includes a first cylindrical chamber for holding a first volume of air. The first cylindrical chamber opens through the second end of the tubular body. A second cylindrical chamber is included in the tubular body for holding a second volume of air. The second cylindrical chamber is coaxially aligned with the first chamber but opens through the second end of the tubular body through a first fluid pathway extending through the tubular body and interconnecting the second cylindrical chamber with the second end of the tubular body at a different location than the opening of the first cylindrical chamber. A third cylindrical chamber is provided in the tubular body for holding a third volume of air. The third cylindrical chamber is coaxially aligned with the first and second cylindrical chambers. The third cylindrical chamber opens through the second end of the tubular body through a second fluid pathway extending through the tubular body and interconnecting the third cylindrical chamber with the second end of the tubular body at a location different from both the opening for the first cylindrical chamber and opening for the second cylindrical chamber.

In such a three volume, air displacement pipette assembly, the plunger assembly has a first portion having an external diameter substantially equal to the internal diameter of the first cylindrical chamber, a second portion having an external diameter substantially equal to the internal diameter of the second cylindrical chamber, and a third portion having an external diameter substantially equal to the internal diameter of the third cylindrical chamber. The first, second, and third portions of the plunger assembly are coaxially aligned and the plunger assembly is positioned within the tubular body so that the first portion, second portion, and third portion cooperate with the first cylindrical chamber, second cylindrical chamber, and third cylidrical chamber respectively.

The three volume air displacement pipette also includes three removable dispensing tips which can be mounted to the second end of the tubular body. The first mounting tip can be mounted to the second end of the tubular body to block or occlude the second and third cylindrical chambers by blocking the first and second fluid pathways which open on the second end of the tubular body. Using the first removable dispensing tip, liquid can be transferred into and out of the first removable dispensing tip in a volume corresponding to the volume or fractional portion thereof of air displaced in the first cylindrical chamber of the pipette assembly.

A second removable dispensing tip, when mounted on the second end of the tubular body, blocks or occludes the second fluid pathway interconnecting the third cylindrical chamber with the second end of the tubular body. With the second removable dispensing tip mounted on the second end of the tubular body, air can be transferred into and out of both the first and second cylindrical chambers. Correspondingly, liquid of equivalent volume is transferred into and out of the second removable dispensing tip.

A third removable dispensing tip assembly can be mounted on the second end of the tubular body which does not block any of the three openings. That is, when the third removable dispensing tip is mounted on the second end of the tubular body, air can be transferred into and out of all three of the cylindrical chambers in the tubular body. With the third removable dispensing tip, liquid corresponding in volume to the volume of the three chambers is transferred into and out of the third removable dispensing tip.

The multi-volume displacement pipette assembly can also include a vent channel. The vent channel can extend from an annular space extending around the second end of the tubular body and enclosed by each of the removable dispensing tips when such removable dispensing tips are mounted on the second end of the tubular body. The vent channel extends from the second end along a portion of the length of the tubular body and then opens to the atmosphere to channel off unused, displaced air; i.e., the air displaced by the second and third portions of the plunger assembly when air is being transferred into and out of only the first cylindrical chamber. Similarly, the vent channel can displace air displaced by the third portion of the plunger assembly from the third cylindrical chamber when air is being transferred into and out of the first and second cylindrical chambers to transfer a volume of liquid equivalent to only such first and second cylindrical chambers.

BRIEF DESCRIPTION OF THE DRAWINGS

Other features of the invention herein will become apparent in view of the following detailed description and the accompanying drawings wherein.

DETAILED DESCRIPTION OF THE INVENTION

Figures 1, 1A:
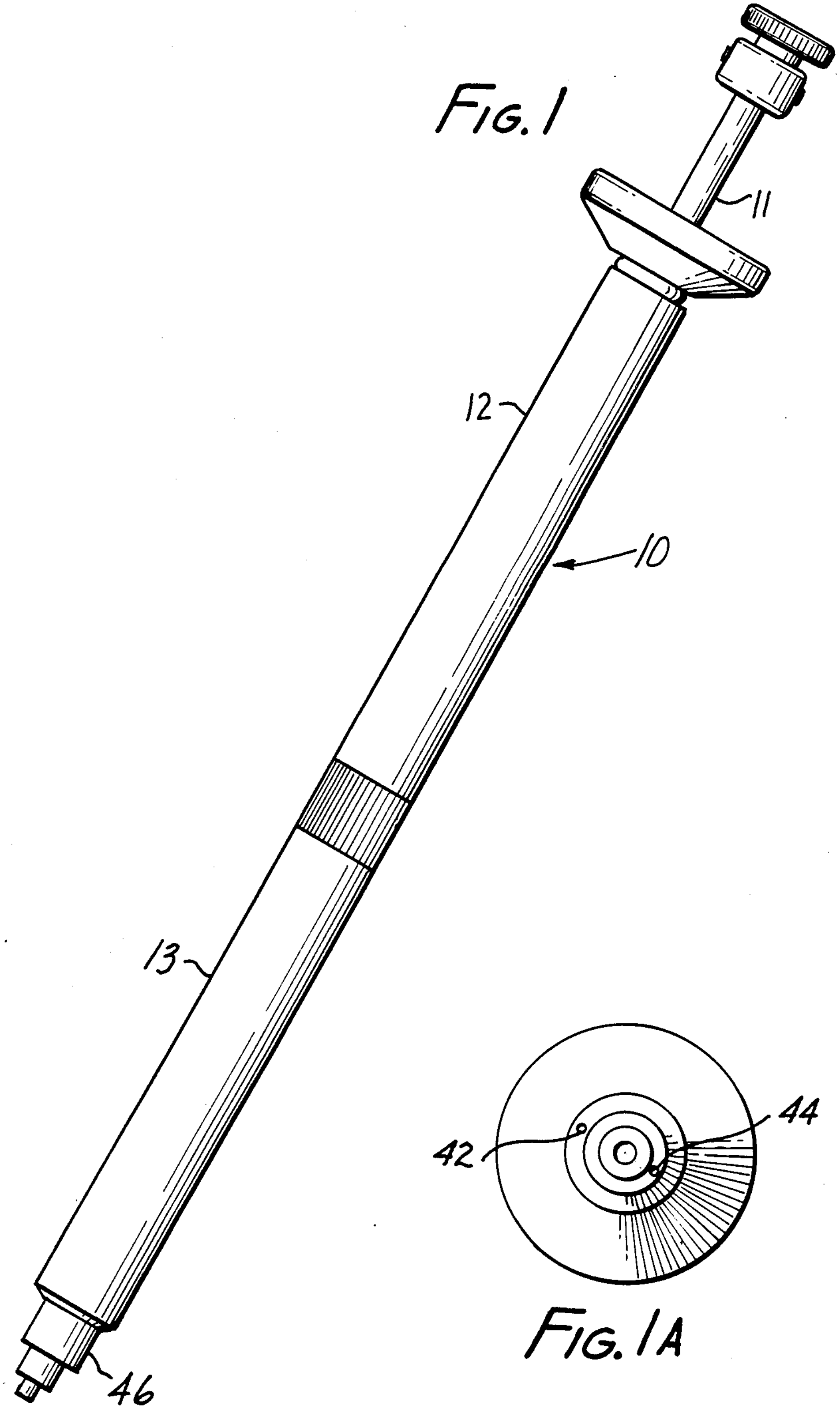
FIG. 1 is a perspective view of an embodiment of a pipette having the multi-volume displacement pipette assembly herein mounted thereon.
FIG. 1A is a distal end view of the assembly shown in FIG. 1.
Figure 5:
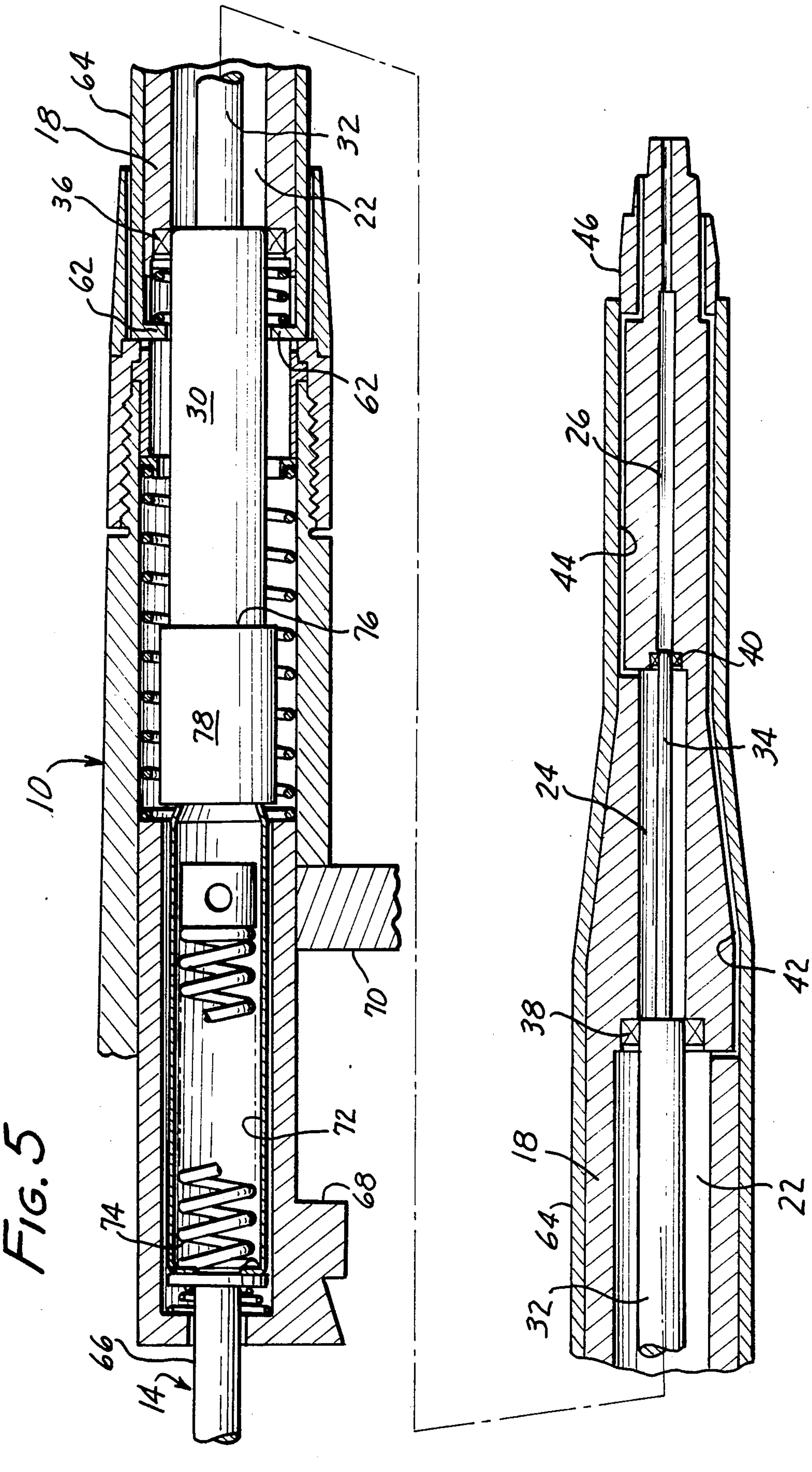
FIG. 5 is an elevational, fragmented, cross-sectional view showing an actuation mechanism for the plunger assembly.

Referring to FIG. 1, there is shown an overall view of an embodiment of a pipette assembly 10. The pipette assembly 10 includes a reusable plunger actuation assembly 12 and the multi-volume displacement pipette assembly 13 which is the subject matter of the present invention. The multi-volume displacement pipette assembly 13 can be mounted through appropriate mounting means (such as by a snap-ring collar structure 62 shown in FIG. 5) to any suitable plunger actuation assembly, many of which are commercially available. The multi-volume displacement pipette 13 can be directly actuated by a plunger assembly 11 which extends outwardly from the pipette assembly 13 or a plunger actuation assembly such as an assembly similar to that shown in U.S. Pat. No. 4,178,803, the entire disclosure of which is incorporated herein by this reference. The replaceable or disposable multi-volume displacement pipette assembly 13 can be replaceably interconnected with the tubular body member of the pipette assembly 10.

Figure 2:
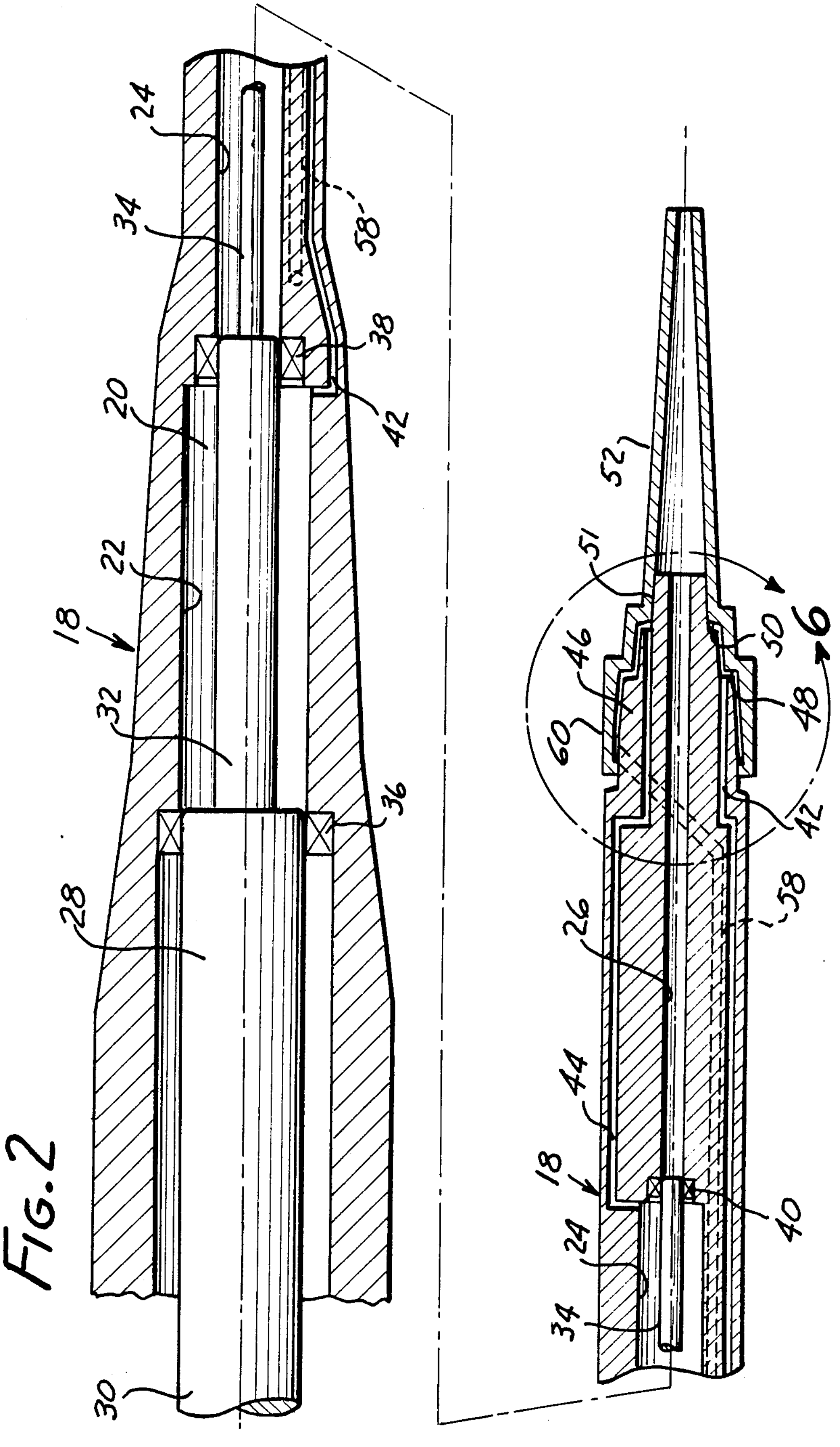
FIG. 2 is an elevational, fragmented cross-sectional view of a multi-volume displacement pipette assembly herein with a first removable dispensing tip mounted thereon.

Referring to FIG. 2, a fragmented, side elevational, cross-sectional view of a multi-volume displacement pipette assembly 18 is illustrated. The embodiment illustrated in FIG. 2 is that of a multi-volume pipette assembly having three chambers. Such a three-chambered assembly will be described herein although any multiple chambered assembly is intended to be part of the invention herein.

The multi-volume displacement pipette assembly 18 includes a generally tubular housing (also shown as 18 in the drawings). Provided in the housing is a generally centrally extending lumen 20 which is open through the length of the housing. The lumen 20 defines a first chamber 26, a second chamber 24, and a third chamber 22. The first chamber, second chamber, and third chamber have differing volumes which can be provided by each of the chambers having a different inside diameter. The cross section of the chambers can be any suitable cross section such as circular, triangular, rectangular, pentagonal, hexagonal, and the like, but in the preferred embodiment the chambers are generally cylindrical and thereby have a circular cross section. The three chambers are coaxially aligned and open to one another except that in the assembled pipette assembly the three chambers are sealed from each other so that fluid does not flow from one chamber to the other as will hereinafter be more fully explained. The fluid seal is formed by a sealing gasket and the plunger assembly.

Positioned inside the tubular body is a plunger shaft assembly 28. The plunger shaft assembly is operatively mounted within the tubular body for reciprocal, longitudinal movement in the tubular body through the three chambers. The plunger shaft assembly has the same cross-sectional shape as the chambers. The plunger shaft assembly 28 includes a first portion 34 which has an outer diameter substantially equal to the inside diameter of the first chamber 26. The first portion 34 is coaxially aligned with a second portion 32 which has an outside diameter substantially equal to the inside diameter of the second chamber 24. The plunger shaft assembly 28 further includes a third portion 30 which is coaxially aligned with the first and second portions and which third portion has an outside diameter substantially equal to the inside diameter of the third chamber 22 in the tubular body. In FIG. 2, the plunger shaft assembly 28 is positioned in its withdrawn position and is ready for longitudinal movement to its depressed position. That is, each of the first, second, and third portions of the plunger shaft assembly is withdrawn from the respective first, second, and third cylindrical chambers. Upon actuation of the plunger shaft assembly, the plunger shaft assembly will move to the right of the figure and each of the first, second, and third portions of the plunger shaft assembly will enter and move through the respective first, second, and third chambers.

To prevent fluid from flowing from one of the chambers into an adjacent chamber, a seal is provided around each of the first, second, and third portions of the plunger shaft assembly. That is, a seal such as an O-ring seal is positioned around each of the portions of the plunger shaft assembly to provide a fluid-tight seal and to permit longitudinal movement of each portion of the plunger shaft assembly therethrough. With reference to FIG. 2, there is a first seal 40, a second seal 38, and a third seal 36 which extend around the first portion, second portion, and third portion of the plunger shaft assembly respectively.

As the first, second, and third portions of the plunger shaft assembly move through each of the first, second, and third cylindrical chambers, they displace or draw in fluid (i.e., air) into the respective chambers depending upon the direction of movement of the plunger shaft assembly. Since fluid cannot flow axially from one chamber to another, separate fluid paths to the end of the pipette assembly have been provided in the sidewall of the pipette assembly for the second chamber and third chamber. The first chamber opens through the distal end 46 of the pipette assembly. The term distal is used herein to refer to the end extending away from the user of the assembly. The first chamber 26 opens through a provided coaxial opening on the distal end.

The second cylindrical chamber 24 is also open through the distal end 46 of the pipette assembly. The second chamber is open through a first fluid pathway or lumen 44 which extends from the distal end of the second chamber 24, through the sidewall of the tubular housing. The first fluid pathway 44 opens through the distal end 46. The first fluid pathway opens through a first shoulder 50 provided on the distal end (also shown enlarged in FIG. 6).

In a similar fashion to the second chamber, the third chamber 22 is open through the distal end 46. A second fluid pathway or lumen 42 extends from the distal end of the third chamber 22 through the sidewall of the tubular body and opens on the distal end 46. The second fluid pathway 42 opens on a second shoulder 48 provided on the distal end 46. Although the first and second fluid pathways are illustrated as opening on the generally flat circular surface of the shoulders, they can also open on the cylindrical sidewall surfaces.

Figure 6:
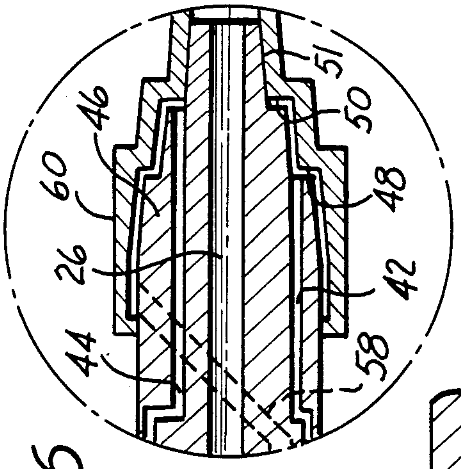
FIG. 6 is an enlarged fractional view in cross section of the portion of the embodiment shown in FIG. 2 as 6—6.

Provided on the distal end 46 of the pipette assembly proximal to the opening of the second fluid pathway is an opening to a third lumen 58. The third lumen 58 is a vent lumen. The vent lumen 58 extends from the distal end through the sidewall of the tubular body and opens outwardly of the pipette assembly at a location spaced along the tubular body a sufficient distance so as not to be inserted in the liquid when liquid is drawn into or dispensed from the pipette assembly. The vent channel or vent lumen serves to channel off unused or displaced air; i.e., the air displaced by the second portion (medium shaft portion) and third portion (large shaft portion)

when a small or first dispensing tip 52 is placed on the pipette assembly, or the air displaced by the third shaft portion 30 (large shaft portion) when the medium dispensing tip 54 (FIG. 3) is used as will be more fully understood hereinafter. The vent lumen 58 opens at the distal end into an annular space 60 formed between the distal end and a provided replaceable dispensing tip 52 (as shown in FIG. 6). The annular space 60 formed is formed regardless of whether a small, medium, or large replaceable dispensing tip is mounted on to the distal end 46.

Still referring to FIG. 2, a small replaceable first dispensing tip 52 is attached to the distal end 46 of the pipette assembly. The small replaceable dispensing tip 52 has a pair of shoulders which mate with the first shoulder 50 and second shoulder 48 of the distal end. The sidewall of the first dispensing tip 52 has a taper within its main lumen which forms a fluid-tight seal with the cylindrical sidewall of the distal end between the furthermost projection of the distal end 46 and the first shoulder 50. The sealing area is generally shown by the identifying numeral 51. The seal is a circumferential seal between the surface areas of the distal end and the first tip 52.

The mounting or mating of the first dispensing tip 52 to the distal end 46 is shown in an enlrged view in FIG. 6. With regard to FIG. 6, it can be seen that the first cylindrical chamber 26 is open through the distal end and thus provides a flow path for air into and out of the first chamber 26, depending upon the movement of the plunger shaft assembly, and more particularly, the first portion 34 of the plunger shaft assembly. The second and third cylindrical chambers are open to an annular space 60 between the distal end and first dispensing tip through the first fluid pathway 44 and second fluid pathway 42. Due to the fluid-tight seal 51, any air displaced by movement of the second and third portions of the plunger shaft assembly through the second and third chambers does not blow by or flow past the seal 51 but flows through fluid pathways 44 and 42.

Figure 3:
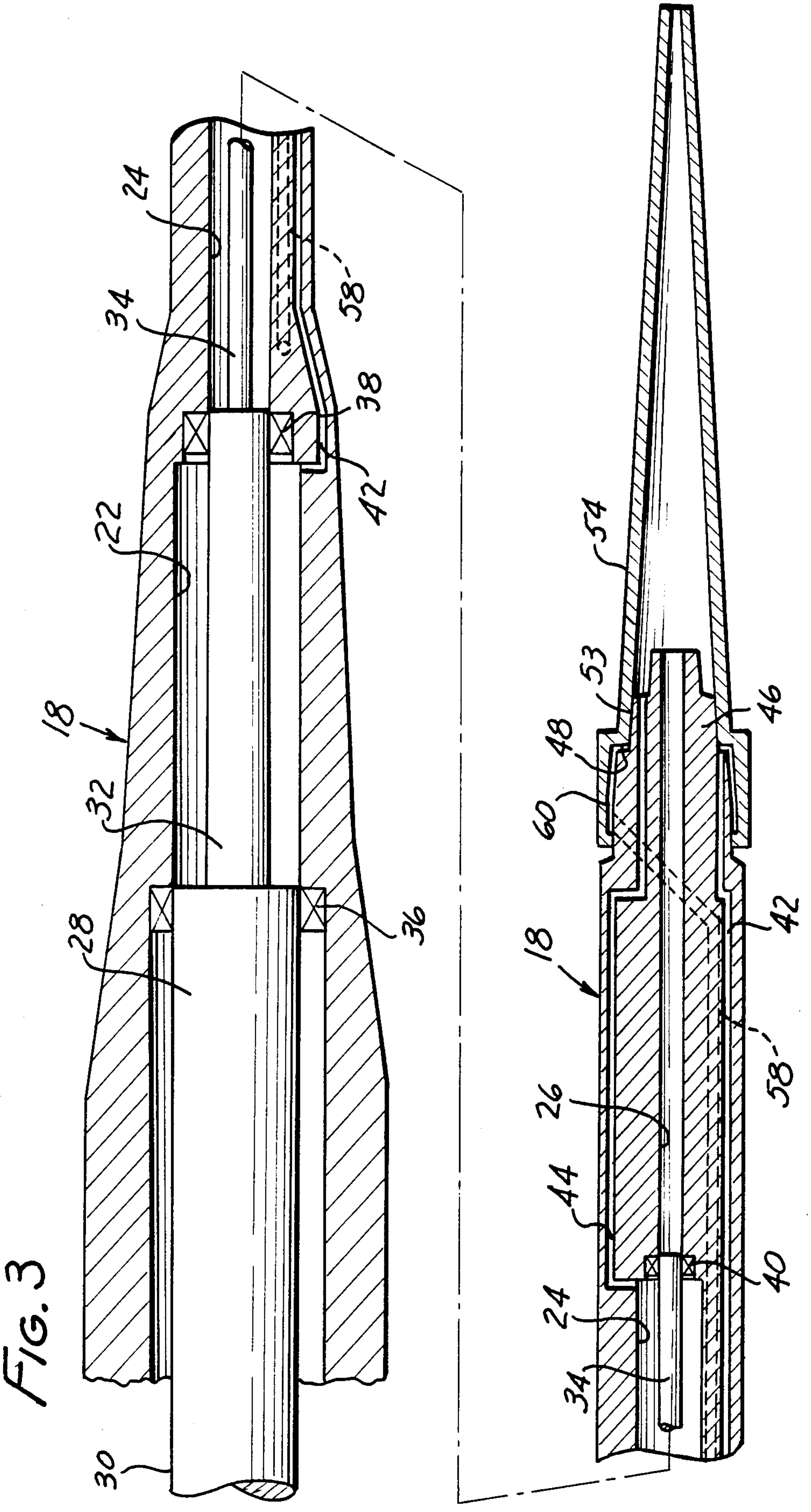
FIG. 3 is an elevational, fragmented, cross-sectional view of a multi-volume displacement pipette assembly herein with a second removable dispensing tip mounted thereon.

Now referring to FIG. 3, the multi-volume pipette assembly is illustrated with a medium dispensing tip or second dispensing tip 54. The second dispensing tip 54 permits fluid communication between the second chamber 24 and the distal end 46. Any air (or fluid) displaced from the second cylindrical chamber 24 can flow to the lumen of the second tip 54 through the first fluid pathway 44. The second replaceable dispensing tip 54 is provided with one shoulder which effectively blocks the second fluid pathway or second lumen 42. A fluid-tight seal is provided between the sidewall of the distal end 46 and the sidewall in the shoulder region of the lumen on the second replaceable dispensing tip 54, which seal is proximal of the opening of such first fluid pathway 44. The fluid seal forms in the area generally designated as 53 on FIG. 3. By providing a fluid-tight seal at the area 53, any fluid or air displaced by movement of the third portion of the plunger shaft assembly through the third chamber displaces air through the second fluid pathway or second lumen 42, which air is directed to the annular space 60 between the distal end and the sidewall of the second replaceable dispensing tip 54. The annular space 60 remains in fluid flow communication with the vent lumen 58 and any air displaced from the third chamber 22 can be vented from the pipette assembly.

Figure 4:
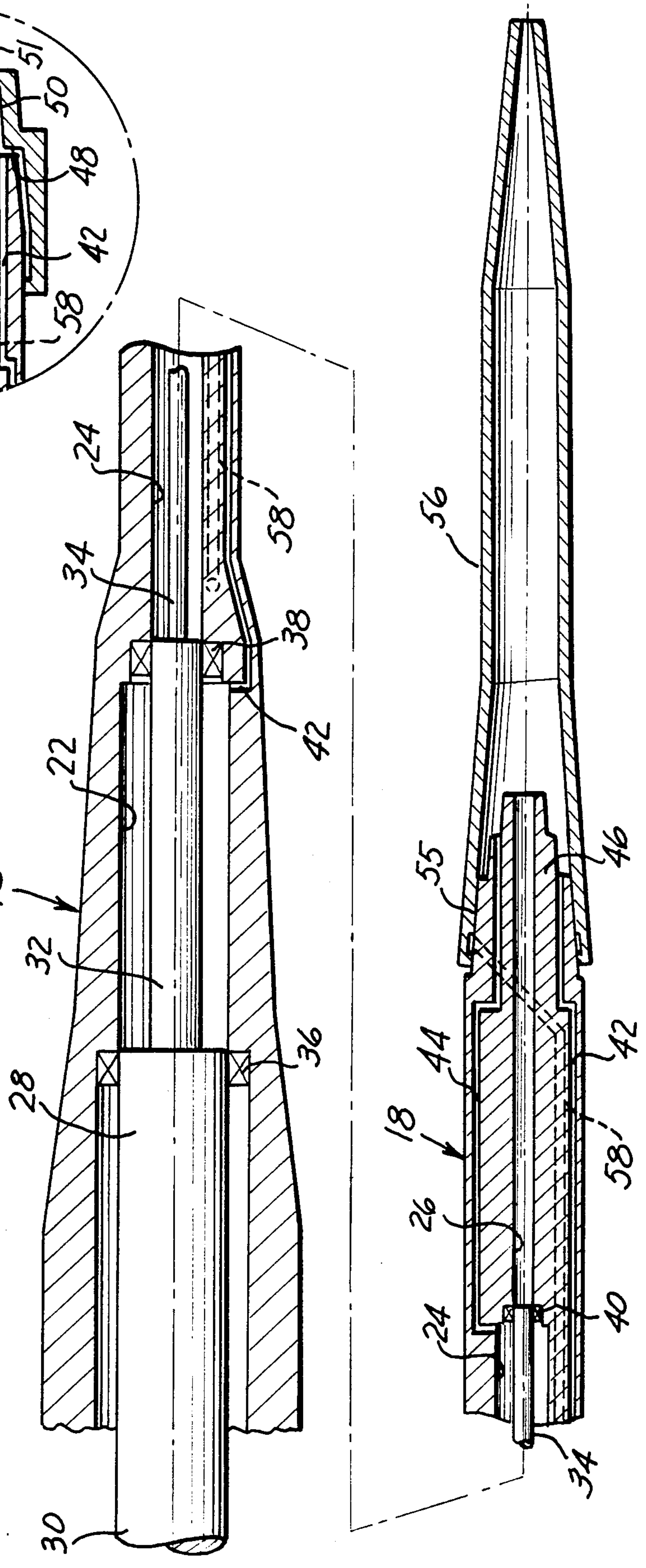
FIG. 4 is an elevational, fragmented, cross-sectional view of a multi-volume displacement pipette assembly herein with a third removable dispensing tip mounted thereon.

Now referring to FIG. 4, the pipette assembly herein is shown with a third replaceable dispensing tip 56, or a large dispensing tip so as to enable all three cylidrical chambers of the pipette assembly to be utilized and in fluid flow communication through the distal end. As can be seen in FIG. 4, the first cylindrical chamber is open to the lumen of the third replaceable dispensing tip 56. The second cylindrical chamber is open to the lumen of the third dispensing tip through the first fluid pathway 44 at the distal end 46. The third cylindrical chamber 22 is open through the second fluid pathway 42 which opens from the distal end into the lumen of the third replaceable dispensing tip 56. The third replaceable dispensing tip 56 forms a fluid-tight seal around the outer surface of the distal end 46 with the sidewall of the third dispensing tip at the area designated as 55, which seal is proximal of the opening of such second fluid pathway 42. The third replaceable dipsensing tip 56 does not need a shoulder although one may be used which does not occlude the opening of the second fluid pathway 42. With all three chambers open to the lumen of the third replaceable dispensing tip 56, there is no need for the vent lumen 58 so it can be effectively blocked when such a third replaceable dispensing tip 56 is used.

From the above description of the three embodiments shown in FIGS. 2–4, it is believed that an understanding can be had with regard to the operation of the pipette assembly. As the plunger assembly is reciprocally and longitudinally moved within the pipette assembly, it can draw fluid such as air into the chambers or dispense fluid from the chambers which causes a corresponding drawing in or dispensing of liquid in the replaceable dispensing tips, depending upon which replaceable dispensing tip is mounted on the distal end 46 of the pipette assembly. The lumen of the appropriate replaceable dispensing tip either is open to or is sealed from the respective openings to the second and third chambers so as to enable the operator to select whether the volumes of the second and third chambers are required for the liquid transfer to be performed.

It should be noted that when either the first or second replaceable dispensing tips 52 and 54 are being utilized that the volume occupied by the first portion 34 of the plunger shaft assembly or the second portion 32 of the plunger shaft assembly are compensated for as each of the plunger shaft portions displaces an equivalent volume of fluid in the respective first and second chambers upon liquid transfer. For example, when all three chambers are employed with the third replaceable dispensing tip 56, the volume occupied by the second shaft in the third chamber is compensated for when that very same shaft portion displaces an equivalent amount of fluid in the second chamber and the volume occupied by the first portion of the plunger shaft assembly is compensated for when that very same shaft portion displaces an equivalent amount of fluid from the first cylindrical chamber.

It should be noted that for the first, second, and third replaceable dispensing tips that they all generally extend to about the same position along the sidewall of the distal end of the tubular body. They all extend proximal to the distal opening of the vent lumen 58. In extending to about the same position, they can all be removed by actuation of a tip removal assembly on the pipette assembly, such as by forward movement of the outer sleeve 64 shown in FIG. 5.

The operation of the pipette assembly herein will be described with regard to FIG. 4. With regard to the assembly shown in FIG. 4, the third replaceable dispensing tip 56 can be immersed in a liquid to be transferred by the pipette assembly. Prior to inserting the tip into the liquid, the plunger assembly is pushed into the pipette assembly to its full position. As the plunger assembly is withdrawn, each of the first portion, second portion, and third portions of the plunger shaft assembly are withdrawn from the respective first cylindrical chamber, second cylindrical chamber, and third cylindrical chamber. As the plunger shaft portions withdraw from the cylindrical chambers, a partial vacuum is created which draws air into each of the chambers. Air is drawn into the third chamber through the second lumen 42, air is drawn into the second chamber through the first lumen 44, and air is drawn into the first chamber directly through the opening on the distal end. The air is drawn into the chambers from the lumen of the dispensing tip concomitantly creating a partial vacuum in such lumen. Simultaneously with creation of the partial vacuum, the liquid is drawn into the lumen of the dispensing tip on the pipette assembly. Subsequently, the assembly is withdrawn from the liquid reservoir. The volume of liquid corresponds to the available volume of the chambers, in essence the total volume of the third chamber. The liquid is subsequently dispensed from the assembly by application of a force on the plunger shaft assembly. As each portion of the plunger shaft assembly is pushed through its respective chamber, it displaces air and correspondingly the liquid in the tip. The displaced air flows to the distal end through either the first lumen 44, second lumen 42, or directly through the first cylindrical chamber 26. In a similar fashion, the embodiments shown in FIGS. 2 and 3 can be operated to transfer liquid.

The assembly herein can be used with a plunger actuation assembly which is designed to move a plunger in precise increments to deliver varying volumes of liquid. That is, the plunger moves a selected distance and thereby displaces (or draws in) a precise volume of air and correspondingly a precise volume of liquid in the dispensing tip. Such a selected volume can be an increment of the total volume of the available volume provided by the assembly herein. A volume-selective plunger actuation assembly which can be used is disclosed in co-pending patent appliction Ser. No. 588,921, filed Mar. 12, 1984, titled "Hand-Held Pipette With Disposable Capillary," now U.S. Pat. No. 4,567,780, and assigned to the same assignee, the entire disclosure of which is incorporated herein by this reference.

A working embodiment was constructed, which could provide liquid transfer with a first (small) dispensing (tip as shown in FIG. 2) of from about 5 to about 35 microliters. In such embodiment with a second (medium) dispensing tip (as shown in FIG. 3), a volume of about 20 to about 200 microliters could be transferred. With a third (large) dispensing tip (as shown in FIG. 4), a volume from about 100 to about 1000 microliters could be transferred. The embodiment is an improvement over state of the art systems as four or more pipettors would be required to transfer such a range of volumes.

It can be realized that although a multi-volume displacement pipette having three chambers has been described herein that multi-volume displacement pipettes with two or more chambers can be produced and are encompassed by the description herein. Although such a three chamber embodiment has been illustrated and described, various other modifications and changes can be resorted to without departing form the spirit of the invention or the scope of the appended claims and each of such modifications and changes is contemplated.

We claim:

1. A multi-volume displacement pipette assembly comprising:

a tubular body having a first end for receiving a plunger and a second end including tip mounting means for receiving a removable dispensing tip;

a first generally cylindrical chamber in the tubular body for holding a first volume of fluid, which first cylindrical chamber opens through the second end of the tubular body;

at least one second generally cylindrical chamber in the tubular body for holding a second volume of fluid and which is coaxially aligned with the first chamber, which second cylindrical chamber opens through the second end of the tubular body through a fluid pathway extending through the tubular body and interconnecting such at least one second cylindrical chamber with the second end of the tubular body;

a plunger assembly coaxial with the tubular body and operatively mounted therein for reciprocal, longitudinal movement through the first cylindrical chamber and such at least one second cylindrical chamber in the tubular body to displace or draw in fluid to such first cylindrical chamber and at least one second cylindrical chamber, the plunger assembly comprising a first portion having an external diameter substantially equal to the internal diameter of the first cylindrical chamber and at least one second portion coaxially aligned with the first portion and having an external diameter substantially equal to the internal diameter of such at least one second cylindrical chamber;

fluid sealing means between the first cylindrical chamber and such at least one second cylindrical chamber for preventing fluid communication between chambers but permitting reciprocal, longitudinal movement of the plunger assembly; and a removable dispensing tip means for mounting to the mounting means on the second end of the tubular body and which removable dispensing tip means selectively provides fluid flow through such fluid pathway extending through the tubular body and interconnecting such at least one second cylindrical chamber with the second end wherein said removable dispensing tip means comprises a generally conically shaped tubular body having a lumen extending therethrough, which lumen is coaxially aligned and in fluid communication with the first chamber, and a shoulder on the removeable dispensing tip means forming a greater diameter portion of the lumen through the removable dispensing tip means, which greater diameter portion forms a seal with the second end of the tubular body to prevent liquid flow through the fluid pathway from such at least one second cylindrical chamber.

2. A multi-volume displacement pipette assembly as recited in claim 1 wherein the removable dispensing tip means further comprises a first shoulder forming a greater diameter portion of the lumen through the removable dispensing tip means and a second shoulder forming a second enlarged portion of the lumen for providing a seal with the second end of the tubular body to provide liquid communication between the lumen of the removable dispensing tip means and the first cylindrical chamber and such second cylindrical chamber while preventing fluid communication through the second fluid pathway from the third cylindrical chamber.

3. A multi-volume displacement pipette assembly as recited in claim 1 wherein:

a third generally cylindrical chamber in the tubular body for holding a third volume of fluid, which third cylindrical chamber is coaxially aligned with the first cylindrical chamber and second cylindrical chamber, and which third cylindrical chamber opens through the second end of the tubular body through a second fluid pathway extending through the tubular body and interconnecting such third cylindrical chamber with the second end of the tubular body.

4. An air displacement pipette assembly which can be mounted on a plunger actuator assembly for transferring liquids, the disposable air displacement pipette assembly comprising:

a tubular body having a first end for receiving a plunger rod means and provided with mounting means for mounting the tubular body to a plunger actuation assembly, the tubular body having a second end provided with tip mounting means for receiving a replaceable dispensing tip;

a first chamber in the tubular body for holding a first volume of air, which first chamber opens through the second end of the tubular body;

at least one second cylindrical chamber in the tubular body for holding a second volume of air and which is coaxially aligned with the first chamber and which at least one second cylindrical chamber opens through the second end of the tubular body through a fluid pathway extending through the tubular body and interconnecting such at least one second cylindrical chamber with the second end of the tubular body;

a plunger rod means operatively mounted in the tubular body for reciprocal, longitudinal movement through the first chamber and such at least one second chamber for drawing air or displacing air in the chambers, the plunger rod means comprising a first portion having an external diameter substantially equal to the internal diameter of the first cylindrical chamber and at least one second portion coaxially aligned with the first portion and having an external diameter substantially equal to the internal diameter of such at least one second chamber; and a third cylindrical chamber in the tubular body for holding a third volume of air, which third cylindrical chamber is coaxially aligned with the first and second cylindrical chambers, and which third cylindrical chamber opens through the second end of the tubular body through a second fluid pathway extending through the tubular body and interconnecting such third cylindrical chamber with the second end of the tubular body;

fluid sealing means between the first cylindrical chamber and such at least one second cylindrical chamber for preventing fluid communication between chambers but permitting reciprocal, longitudinal movement of the plunger assembly;

a removable dispensing tip means for mounting on the second end of the tubular body and which selectively permits or prevents air flow through such fluid pathway extending through the tubular body and interconecting such at least one second cylindrical chamber with the second end; and wherein the removable dispensing tip means comprises a generally conically shaped tubular body having a lumen extending therethrough, which lumen is coaxially aligned and in fluid communication with the first chamber, and a shoulder on the removable dispensing tip means forming a greater diameter portion of the lumen through the removable dispensing tip means, which greater diameter portion forms a seal with the second end of the tubular body to prevent fluid flow through the fluid pathway from such at least one second cylindrical chamber; and a vent lumen extending through the tubular body from an opening along the sidewall spaced from the first end to an opening on the second end; which opening on the second end opens into an annular space between the removable dispensing tip means and the second end of the tubular body.

5. An air displacement pipette assembly which can be mounted on a plunger actuator assembly for transferring liquids, the disposable air displacement pipette assembly comprising:

a tubular body having a first end for receiving a plunger rod means and provided with mounting means for mounting the tubular body to a plunger actuation assembly, the tubular body having a second end provided with tip mounting means for receiving a replaceable dispensing tip;

a first chamber in the tubular body for holding a first volume of air, which first chamber opens through the second end of the tubular body;

at least one second cylindrical chamber in the tubular body for holding a second volume of air and which is coaxially aligned with the first chamber and which at least one second cylindrical chamber opens through the second end of the tubular body through a fluid pathway extending through the tubular body and interconnecting such at least one second cylindrical chamber with the second end of the tubular body;

a plunger rod means operatively mounted in the tubular body for reciprocal, longitudinal movement through the first chamber and such at least one second chamber for drawing air or displacing air in the chambers, the plunger rod means comprising a first portion having an external diameter substantially equal to the internal diameter of the first cylindrical chamber and at least one second portion coaxially aligned with the first portion and having an external diameter substantially equal to the internal diameter of such at least one second chamber; and a third cylindrical chamber in the tubular body for holding a third volume of air, which third cylindrical chamber is coaxially aligned with the first and second cylindrical chambers, and which third cylindrical chamber opens through the second end of the tubular body through a second fluid pathway extending through the tubular body and interconnecting such third cylindrical chamber with the second end of the tubular body;

fluid sealing means between the first cylindrical chamber and such at least one second cylindrical chamber for preventing fluid communication between chambers but permitting reciprocal, longitudinal movement of the plunger assembly;

a removable dispensing tip means for mounting on the second end of the tubular body and which selectively permits or prevents air flow through such fluid pathway extending through the tubular body and interconnecting such at least one second cylindrical chamber with the second end; and a vent lumen extending through the tubular body from an opening along the sidewall spaced from the first end to an opening on the second end; which opening on the second end opens ito an annular space between the removable dispensing tip means and the second end of the tubular body; and a third cylindrical chamber in the tubular body for holding a third volume of air, which third cylindrical chamber is coaxially aligned with the first and second cylindrical chambers, and which third cylindrical chamber opens through the second end of the tubular body through a second fluid pathway extending through the tubular body and interconnecting such third cylindrical chamber with the second end of the tubular body; and wherein the removable dispensing tip means comprises a generally conically shaped tubular body having a lumen extending therethrough, which lumen is coaxially aligned and in fluid communication with the first chamber, and a shoulder on the removable dispensing tip means forming a greater diameter portion of the lumen through the removable dispensing tip means, which greater diameter portion forms a seal with the second end of the tubular body to prevent fluid flow through the fluid pathway from such at least one second cylindrical chamber.

6. An air displacement pipette assembly as recited in claim 5 wherein the removable dispensing tip means further comprises a first shoulder forming a greater diameter portion of the lumen through the removable dispensing tip means and a second shoulder forming a second enlarged portion of the lumen for providing a seal with the second end of the tubular body to provide fluid communication between the lumen of the removable dispensing tip means and the first cylindrical chamber and such second cylindrical chamber while preventing fluid communication through the second fluid pathway from the third cylindrical chamber.

* * * * *